United States Patent
Bartsch et al.

(10) Patent No.: US 12,365,474 B2
(45) Date of Patent: Jul. 22, 2025

(54) BATTERY PREHEATING SYSTEMS AND METHODS IN AN AIRCRAFT HYBRID ELECTRIC POWERTRAIN

(71) Applicant: VerdeGo Aero, Inc., De Leon Springs, FL (US)

(72) Inventors: Eric Richard Bartsch, Willmette, IL (US); Richard Pat Anderson, De Leon Springs, FL (US); Xavier Gerardo Santacruz, Port Orange, FL (US)

(73) Assignee: VerdeGo Aero, Inc., Daytona Beach, FL (US)

( * ) Notice: Subject to any disclaimer, the term of this patent is extended or adjusted under 35 U.S.C. 154(b) by 425 days.

(21) Appl. No.: 17/637,311

(22) PCT Filed: Aug. 21, 2020

(86) PCT No.: PCT/US2020/047393
§ 371 (c)(1),
(2) Date: Feb. 22, 2022

(87) PCT Pub. No.: WO2021/041209
PCT Pub. Date: Mar. 4, 2021

(65) Prior Publication Data
US 2022/0281351 A1 Sep. 8, 2022

Related U.S. Application Data

(60) Provisional application No. 62/890,778, filed on Aug. 23, 2019.

(51) Int. Cl.
*B60L 58/24* (2019.01)
*B60L 58/26* (2019.01)
(Continued)

(52) U.S. Cl.
CPC .............. *B60L 58/24* (2019.02); *B60L 58/26* (2019.02); *B60L 58/27* (2019.02); *B64D 27/10* (2013.01);
(Continued)

(58) Field of Classification Search
CPC .......... B60L 58/24; B60L 58/26; B60L 58/27; B60L 2200/10; F01P 1/06; F01P 7/14;
(Continued)

(56) References Cited

U.S. PATENT DOCUMENTS 7,147,071 B2   12/2006   Gering
8,742,701 B2    3/2014   Sujan et al.
(Continued)

FOREIGN PATENT DOCUMENTS

| EP | 3666570 A1 * | 6/2020 | ............... B60K 1/00 |
| GB | 2341830 A | 3/2000 | |
| WO | WO-2011036239 A1 * | 3/2011 | ......... B60H 1/00278 |

OTHER PUBLICATIONS

Extended European Search Report from application No. 20858938.2, dated Jul. 17, 2023, 13 pp.
(Continued)

*Primary Examiner* — Grant Moubry
(74) *Attorney, Agent, or Firm* — Greenberg Traurig, LLP

(57) ABSTRACT

A battery heating system for a hybrid aircraft powertrain includes a combustion engine, a battery pack, a combustion engine coolant circuit, and a battery pack coolant circuit. The battery heating system further includes a heat exchanger configured to exchange heat between the combustion engine coolant circuit and the battery pack coolant circuit. The battery heating system further includes at least one throttling device operatively connected to one of the combustion engine coolant circuit or the battery pack coolant circuit. The battery heating system further includes a controller config-
(Continued)

ured to transmit a signal to the at least one throttling device to adjust a flow of coolant through the heat exchanger of at least one of the combustion engine coolant circuit or the battery pack coolant circuit.

18 Claims, 6 Drawing Sheets

(51) Int. Cl.
| | |
|---|---|
| *B60L 58/27* | (2019.01) |
| *B64D 27/10* | (2006.01) |
| *B64D 33/08* | (2006.01) |
| *B64D 33/10* | (2006.01) |
| *H01M 10/615* | (2014.01) |
| *B64D 27/02* | (2006.01) |
| *B64D 33/02* | (2006.01) |
| *F01P 7/14* | (2006.01) |

(52) U.S. Cl.
CPC ............. *B64D 33/08* (2013.01); *B64D 33/10* (2013.01); *H01M 10/615* (2015.04); *B60L 2200/10* (2013.01); *B64D 27/026* (2024.01); *B64D 2033/024* (2013.01); *F01P 2007/146* (2013.01); *F01P 2025/32* (2013.01); *F01P 2050/24* (2013.01)

(58) Field of Classification Search
CPC ...... F01P 7/165; F01P 3/12; F01P 3/20; F01P 2025/32; F01P 2025/40; F01P 2050/20; F01P 2050/24; F01P 2007/146; F01M 1/02; F01M 5/002; B64D 27/02; B64D 27/026; B64D 27/24; B64D 33/08; B64D 33/10; B64D 2033/024; B64D 2027/026; B60W 20/00; H01M 10/6568; H01M 10/663; H01M 10/625; H01M 10/613; H01M 10/66; H01M 2220/20; Y02T 50/40

See application file for complete search history.

(56) References Cited

U.S. PATENT DOCUMENTS

| | | | |
|---|---|---|---|
| 9,174,513 B2 * | 11/2015 | Lee | .................. B60H 1/2218 |
| 9,604,627 B2 | 3/2017 | Yamanaka | |
| 10,752,129 B2 * | 8/2020 | Julien | ...................... F01P 3/20 |
| 2010/0089547 A1 | 4/2010 | King | |
| 2013/0111932 A1 | 5/2013 | Mishima | |
| 2016/0248129 A1 | 8/2016 | Dunham | |
| 2016/0359208 A1 | 12/2016 | Lear | |
| 2017/0225586 A1 | 8/2017 | Zhang et al. | |
| 2018/0309140 A1 | 10/2018 | Grass | |
| 2019/0128570 A1 | 5/2019 | Moxon | |
| 2020/0136202 A1 * | 4/2020 | Trawick | ................ H01M 10/66 |

OTHER PUBLICATIONS

ISA/US, ISR/WO issued in PCT/US20/47393, dated Oct. 4, 2020, 11 pgs.

"The Thermostat" (thecarguys.net) Feb. 1, 2001 (Feb. 1, 2001) [online] retrieved from <URL:https://www.thecarguys.net/coolant_flow_radiator_and_engine_block.pdf>, entire document, especially p. 1 para 4.

"Commander 912" (Infinity Power Parachutes) Jul. 2017 (Jul. 2017) [online] retrieved from <URL: http://www.infinitypowerchutes.com/wp-content/uploads/2017/07/Commander912Brochure.pdf>, entire document.

"SR20" (Cirrus Aircraft) Apr. 2, 2019 (Apr. 2, 2019) [online] retrieved from <URL:https://cirrusaircraft.com/aircraft/sr20/>, entire document.

"Commercial Aircraft Propulsion and Engergy Systems Research: Reducing Global Carbon Emissions: Chapter 3" (National Academies of Sciences, Engineering, and Medicing) 2016 [online] retrieved from <URL: https://www.nap.edu/read/23490/chapter/6>, entire document, especially Introduction.

Office Action from European U.S. Appl. No. 20/858,938, dated Jan. 29, 2025, 7 pp.

* cited by examiner

BATTERY PREHEATING SYSTEMS AND METHODS IN AN AIRCRAFT HYBRID ELECTRIC POWERTRAIN

CROSS-REFERENCE TO RELATED PATENT APPLICATIONS

This application is a 371 National Stage application of International PCT Application No. PCT/US2020/047393, filed Aug. 21, 2020, which claims the benefit of U.S. Provisional Patent Application No. 62/890,778, filed Aug. 23, 2019, the entire contents of which are hereby incorporated by reference in their entirety.

BACKGROUND

New aircraft designs are increasingly using electric motors for propulsion for a wide variety of reasons. Electric motors have high power to weight ratios, favorable torque curves, and mechanical simplicity which all lend themselves to aerospace applications for both VTOL and fixed-wing aircraft. However electric motors require large amounts of electric power to be useful for aerospace propulsion, which requires a weight optimized, reliable source of power onboard an aircraft. Hybrid electric powertrain systems are capable of delivering significantly more energy than battery packs with available battery chemistries. Within a hybrid system, the battery pack is a major component, and it is desirable to optimize the battery pack for the hybrid powertrain.

SUMMARY

In an illustrative embodiment, a hybrid electric powertrain for an aircraft includes a liquid cooled internal combustion engine, a liquid cooled battery pack, a heat exchanger, a bypass throttling device such as a valve, and a control system. When the internal combustion engine is operating, its liquid cooling system circulates engine coolant through the engine to remove excess heat. The hot engine coolant passes through one side of a heat exchanger to heat a liquid cooling circuit that passes through the other side of the heat exchanger and the battery pack. When the engine coolant is above the ambient temperature and the battery temperature is below its normal operating range of temperatures, the control system positions the bypass valve so engine coolant may transfer thermal energy to the battery coolant. When the battery temperature rises to within the normal operating range of temperatures (e.g., a predetermined temperature range based on the battery type, size, number of batteries/cells, etc.), the control system actuates the bypass valve to bypass the heat exchanger so thermal energy is no longer transferred from the engine coolant to the battery coolant. In various embodiments, the bypass valve may include one or more valves or other throttling devices on the engine cooling circuit and/or the battery cooling circuit. For example, a first valve in the engine cooling circuit may be positioned to permit flow of hot coolant into the heat exchanger, and a second valve in the battery circuit may be adjusted to bypass the battery cooling radiator to allow the fluid in the battery circuit to heat faster.

In various embodiments, the bypass valve or other throttling device may be located on the engine cooling circuit and may be used to selectively control whether the engine coolant flows through the heat exchanger.

In various embodiments, the bypass valve or other throttling device may be located on the battery cooling circuit and may be used to selectively control whether the battery coolant flows through the heat exchanger.

In various embodiments, the engine oil from a combustion engine may flow through one side of a heat exchanger while the battery coolant flows through the other side. Since a significant amount of heat is transferred from a combustion engine to the lubricating oil, the oil circulation system may be used to extract heat from a combustion engine and deliver it to a heat exchanger to raise the temperature of liquid coolant supplied to a battery pack.

In various embodiments, the combustion engine may be a turbine engine and the liquid cooling circuit or oil circuit may be configured to extract heat from the turbine engine.

In various embodiments, the control system may monitor the trend of the battery temperature and outside air temperature to proactively initiate heating the battery coolant if the battery temperature is trending downwards and/or the atmospheric temperature is trending downwards rapidly as in a climb to high altitude.

In various embodiments, the control system may monitor an outside air temperature (OAT) sensor, an engine coolant temperature sensor, and/or a battery pack temperature sensor.

In various embodiments, the bypass valve or other throttling device may be throttled between zero and 100% to control the amount of heated engine coolant or engine oil that reaches the heat exchanger, thus providing a steady state method for the control system to provide a desired amount of thermal energy to the battery pack in conditions where the outside air temperature remains significantly below the normal operating temperature range of the battery pack.

In various embodiments, the heated exhaust gasses from the exhaust of a combustion engine may be routed through a heat exchanger to transfer thermal energy to fluid circulated through the battery pack.

DETAILED DESCRIPTION

Figure 1:
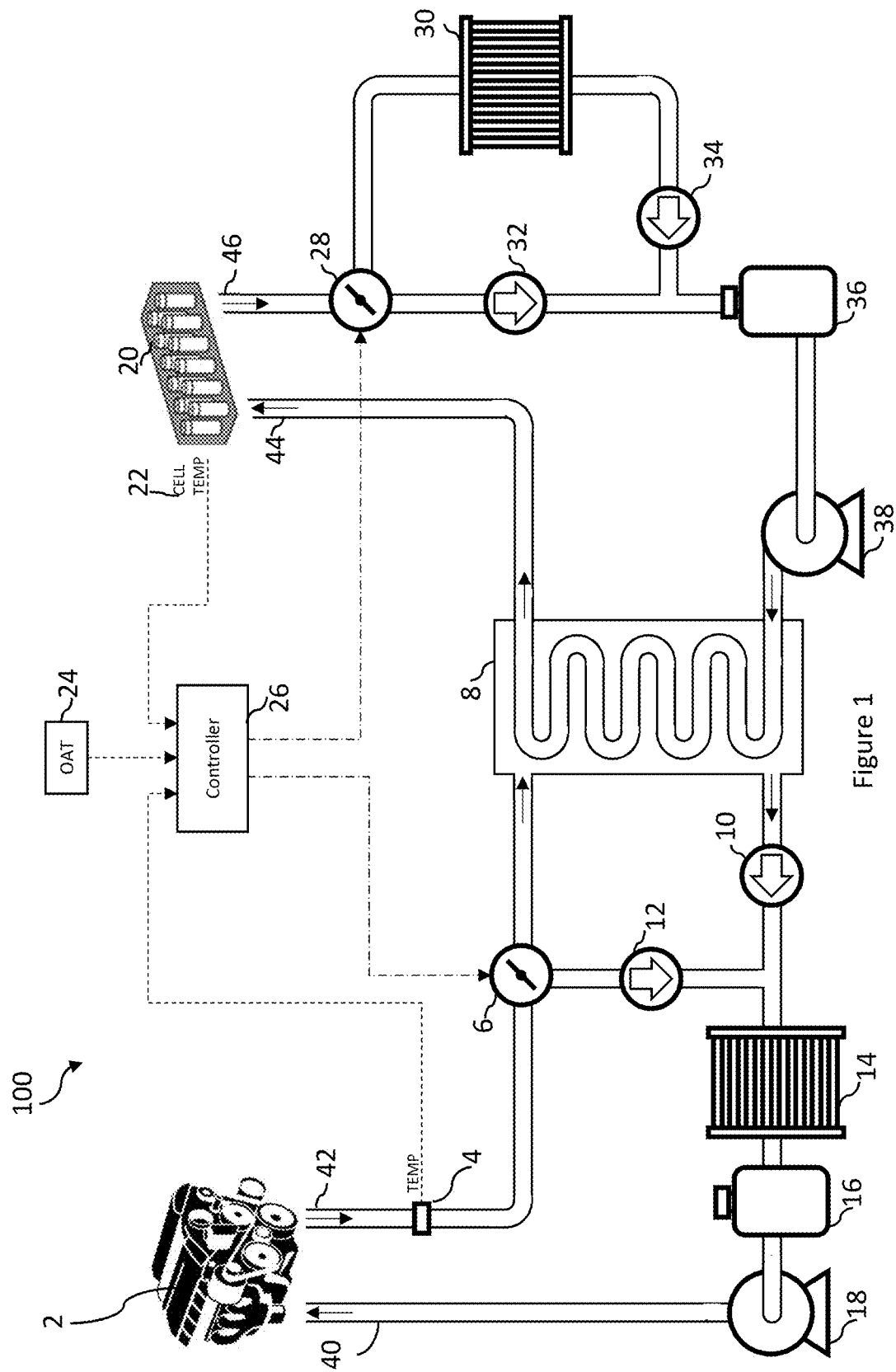
FIG. 1 illustrates a battery heating system utilizing waste heat extracted from a liquid cooled internal combustion engine through the engine coolant with a heat exchanger bypass path on the engine coolant side of the heat exchanger, in accordance with an illustrative embodiment.

Aircraft powertrain systems operate in a diverse array of climates and conditions. While surface temperatures vary significantly, aircraft may also contend with extreme low temperatures at high altitudes that may vary to an even greater extent than surface temperatures. Standard atmospheric temperature at 10,000 feet above sea level is −4.8 degrees Celsius (C) and standard temperature at 25,000 feet above sea level is −34.5 C. Both the available capacity and the discharge rate of batteries are negatively impacted by cold temperatures. It is desirable for aircraft utilizing batteries in their powertrain to deliver high levels of performance for safe operation, and it may not be acceptable for battery performance to be significantly degraded in cold climates and/or at high altitudes. A high-performing hybrid-electric powertrain for aerospace use may benefit from having access to the full battery energy storage capacity as well as the ability to rapidly move energy into and out of the battery pack. One way to keep batteries warm enough to be in their optimal operating range in cold environments is to use electrical power from one or more batteries to operate a resistance heater. Another method of heating a battery pack is to use power from one or more batteries and the internal resistance of one or more batteries to create heat. However, these methods consume energy from the one or more batteries and are therefore less efficient than the methods and systems described herein, which may not use battery power to directly heat one or more batteries. Using power from the batteries themselves may also either be slow to heat the battery or may damage the battery if power is used too rapidly from a cold-soaked battery pack. In a hybrid-electric aircraft as advantageously described herein, thermal management systems in an aircraft's powertrain may be configured such that waste heat from a combustion engine may be used to increase the temperature of the battery pack to a level within its normal operating range when being utilized in cold environments.

The waste heat from a combustion engine may serve as an efficient source of thermal energy, and may be more efficient than electric resistance heating for maintaining the correct operating temperature of a battery pack in aerospace applications. Additionally, the amount of thermal energy from a combustion engine may be significant and may be wasted in applications where the heat is merely exhausted from the combustion engine to keep the combustion engine at a safe operating temperature. It is contemplated, according to the embodiments described herein, that waste heat may be recovered from one or more of the engine coolant, engine oil, and/or engine exhaust. The data below shows some example temperature ranges for such aspects of an internal combustion engine. The oil and coolant temperatures may, in some embodiments where the temperatures are similar to those listed below, be closer to desired temperatures at which batteries may be maintained (e.g., 20 C):

Liquid Cooled Diesel Aviation Engine Oil: 50 C to 140 C
Liquid Cooled Diesel Aviation Engine Coolant: 60 C to 105 C
Diesel exhaust temperature: 200 to 500 C
Gas Exhaust Temp: 400 C to 900 C
Tailpipe exhaust gas temp: 100 C to 300 C Accordingly, in various embodiments, the engine oil and/or the engine coolant may be used to heat battery coolant as described herein. However, in various embodiments, diesel exhaust, gas exhaust, or tailpipe exhaust gas may be used to directly heat battery coolant, may be used to heat a coolant that is used to heat battery coolant (e.g., via a heat exchanger), and/or may be directed through a battery pack housing to directly heat one or more batteries.

Actively heating a battery pack using waste energy from a combustion engine may enable a hybrid-electric propulsion system to be weight optimized by sizing the battery pack capacity with the assumption that the battery pack will always be operated within its normal operating range. Unlike hybrid battery packs that are oversized to compensate for non-ideal operating conditions, such as in automotive contexts, in aerospace applications it is desirable to minimize weight. However, the embodiments described herein may also be used in implementations other than aerospace, such as in automotive contexts that may also have a hybrid drivetrain. The embodiments described herein enable optimizing battery pack size for the desired amount of propulsive power desired to be output by the battery pack, rather than oversizing the battery pack to account for non-optimal operating conditions or to use battery power itself to heat the batteries.

Automotive hybrid systems operate in atmospheric conditions that are largely constant during a usage cycle. Said another way, each time a car is driven, the outside temperature changes very slowly during that drive as weather patterns change. However, aerospace hybrids may be operated at a wide variety of altitudes and aircraft may change altitudes quickly. An aircraft climbing from sea level to 25,000 feet, for example, may transition quickly from a 40 C environment to a −34.5 C environment within minutes, and the reverse may be true when the aircraft descends. Therefore, for an aerospace hybrid electric powertrain designed to manage the temperature of the battery, a system may not only monitor the current battery temperature and battery temperature trend, but also the temperature and trend of the outside air (including expected temperature of outside air) to proactively ensure that the battery remains within its normal operating temperature range. In various embodiments, the aircraft rate of climb/descent may be monitored as a further indicator of the actual or expected changes in the environmental temperature that the battery will experience in the near future. In various embodiments, if a flight plan is known, the system may also determine what altitudes the aircraft will be at during any point of the flight, and may determine or estimate what temperatures the aircraft is or is likely to encounter at those points on a flight. Accordingly, a flight plan may also be used by the system to proactively adjust thermal management systems to ensure batteries stay within a desired temperature range. Weather forecasts and/or actual temperatures measured by other aircraft at varying altitudes and locations may also be used to determine or estimate conditions an aircraft is likely to encounter at one or more points on a flight.

Many lithium battery chemistries, for example, may perform optimally at around 20 C. Regardless of the optimal operating temperature of a battery used, the systems and methods described herein may be used to maintain a battery at or near its optimal operating temperature, or within an optimal or normal operating temperature range. At temperatures above an optimal or normal operating range, the cycle lifetime of the battery may be negatively impacted. For example, at a temperature of 30 C for a lithium battery whose optimal operating temperature is 20 C, there may be a reduction of cycle lifetime of the battery by 20%, and at 40 C cycle lifetime may be reduced by 40%. At temperatures below the normal operating range, the available battery capacity and discharge rates may be negatively impacted. For example, at −20 C the same lithium battery may only have 50% of its capacity available and discharge rates may also be significantly reduced. The ability to charge batteries may also be negatively impacted if a battery is outside its optimal temperature range.

Given that the battery's ability to charge or discharge at full rate is compromised at low temperatures (e.g., temperatures outside of its normal operating temperature range or significantly below its optimal operating temperature), a control system as described herein may also limit the charge and discharge rates applied to the battery at temperatures below a threshold temperature to protect the battery pack. While the combustion engine in a hybrid powertrain is preheating and warming the coolant and/or oil, it may be beneficial for the control system to disengage a generator (e.g., a generator used to charge the battery pack) attached to the combustion engine to protect the battery pack.

Since the engine coolant or oil temperature may also significantly exceed the desired operating temperature range of the battery pack, transfer of thermal energy to the battery pack may be intentionally throttled or limited in various embodiments, otherwise the batteries may become too hot and battery performance may be degraded. For this reason and as described herein, some of the thermal energy from the engine oil or coolant system may be diverted into a heat exchanger while permitting the balance of the energy to flow around the heat exchanger such that it is not transferred to the battery coolant. While the battery cooling circuit is being used for heating, a cooling radiator in the battery cooling circuit may also be partially or fully bypassed in various embodiments to avoid the cooling radiator working against the heat being introduced through the heat exchanger.

Electric aircraft without the heating systems described herein may have special operating limitations related to battery pack temperature because there is no way to heat the batteries. For example, an electric aircraft may have operating temperature ranges that limit the use of the aircraft (e.g., 5 C to 55 C), and battery packs of those aircraft may still be oversized to provide enough power to operate within a given temperature range that may be outside an optimal operating temperature range for the battery packs. In other words, even within that temperature range (e.g., 5 C to 55 C), the batteries may not be operating at or near an optimal efficiency. Electric aircraft may also be limited in operation to lower altitudes such that they are exposed to relatively fewer temperature extremes than a commercial aircraft would be (e.g., at high/low latitudes, at high altitudes). However, it is desirable for a hybrid-electric powertrain for a commercial aircraft as described herein to be able to function safely at a wide range of outside air temperatures and in environments where the outside air temperature (OAT) is changing quickly due to altitude variation. The battery heating systems and methods described herein provide for such a heating system, without contributing significant weight to the aircraft.

Automotive systems may also manage battery temperature but are not well suited for aerospace applications. For example, electric cars may use dedicated battery preheaters that utilize battery energy for heating battery packs in cold weather. However, such battery preheaters add complexity and weight to a system, which may be undesirable for aircraft. In addition, car battery packs may use heaters that are not configured to efficiently maintain battery packs at an optimal range for use, but rather only heat battery packs to a minimum desired temperature for operating the vehicle. This may occur where, for example, the battery pack is oversized and there are not safety concerns that arise if the battery pack is incapable of delivering its full rated power. Therefore, while battery preheaters may be used in automotive applications, such battery packs and/or preheaters are not configured to maintain the batteries at an optimal temperature and therefore deliver full rated battery power. Such preheaters and oversized battery packs may add weight and reduce available energy, which may be undesirable in an aircraft.

Embodiments described herein may also advantageously include one or more valves or other throttling devices that may be throttled rather than merely switched on/off. Such valves may advantageously enable steady state heating of the battery pack where diverting all of the engine coolant or oil through a heat exchanger would overheat the battery pack. In other words, the control system described herein may heat the battery pack at different rates/levels using throttling valves. Similarly, pumps that move fluid through the engine cooling circuit and/or the battery cooling circuit may be controlled to cause the fluid to move at different rates, thereby enabling flexibility in the rate at which the battery coolant and/or the battery pack itself is cooled/heated.

The fluid flowing through the battery cooling circuit as described herein may serve to both heat or cool the battery depending on what is required to keep the temperature of the battery within the normal operating range. A radiator or cooling system in the battery cooling circuit may be used, and the controller or control system may therefore operate a valve or pump for throttling the supply of hot engine coolant and/or battery coolant to the heat exchanger and/or a valve that enables the battery cooling fluid to bypass the battery cooling radiator if the battery is being heated. Advantageously, the systems described herein include separate battery and engine cooling loops, so that the cooling/heating of the different aspects of the hybrid powertrain system may be more easily and efficiently controlled. However, in some embodiments, a single cooling loop may be used along with bypass sections to properly route flow of fluid to the batteries as desired to heat or cool the batteries.

In an aerospace system as described herein, a battery may be heated at times other than during use and/or charging of the battery. For example, ongoing heating may be used when an aircraft is cruising at an altitude with cold air in a flight condition where the battery is not actively being charged or discharged to generate its own internal heat. In this way, the battery is maintained at a proper temperature such that the battery is ready for use or charging whenever desired.

Maintaining a proper battery temperature may also be a safety benefit in aircraft due to advantages of minimizing the weight of the battery pack such that maximum performance may be available per weight of battery carried on the aircraft. Because batteries on an aircraft may be utilized to control and safely operate the aircraft, batteries that are not maintained at or near an optimal temperature may present safety issues where the batteries cannot provide the power needed to safely operate the aircraft (e.g., at times where high power is needed such as during a vertical takeoff or landing of an aircraft). In addition, certain batteries may be unsafe to operate at certain temperatures, but the systems and methods described herein may be used to keep batteries within their safe operating temperature ranges.

Figure 2:
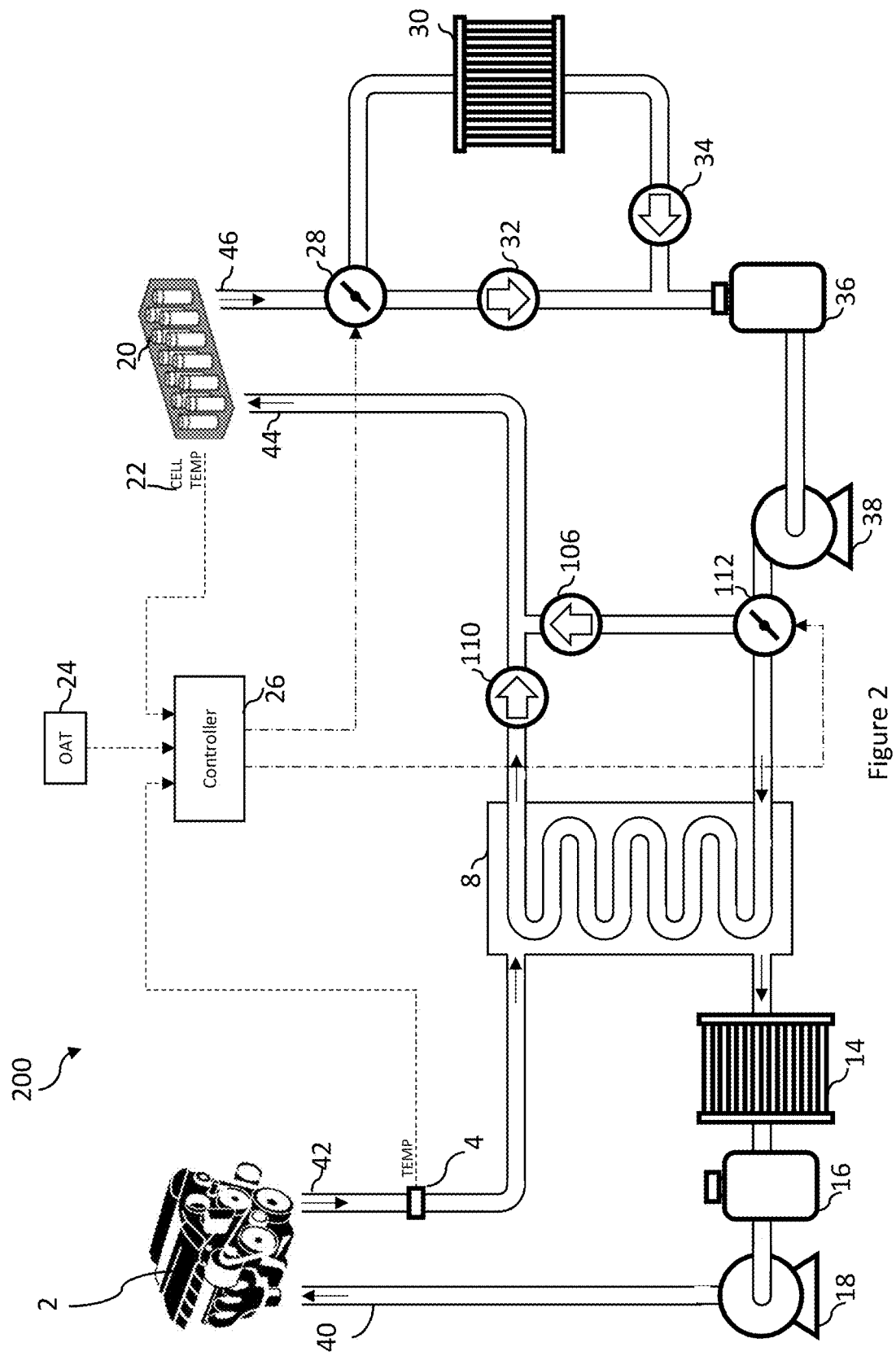
FIG. 2 illustrates a battery heating system utilizing waste heat extracted from a liquid cooled internal combustion engine through the engine coolant with a heat exchanger bypass path on the battery coolant side of the heat exchanger, in accordance with an illustrative embodiment.
Figure 3:
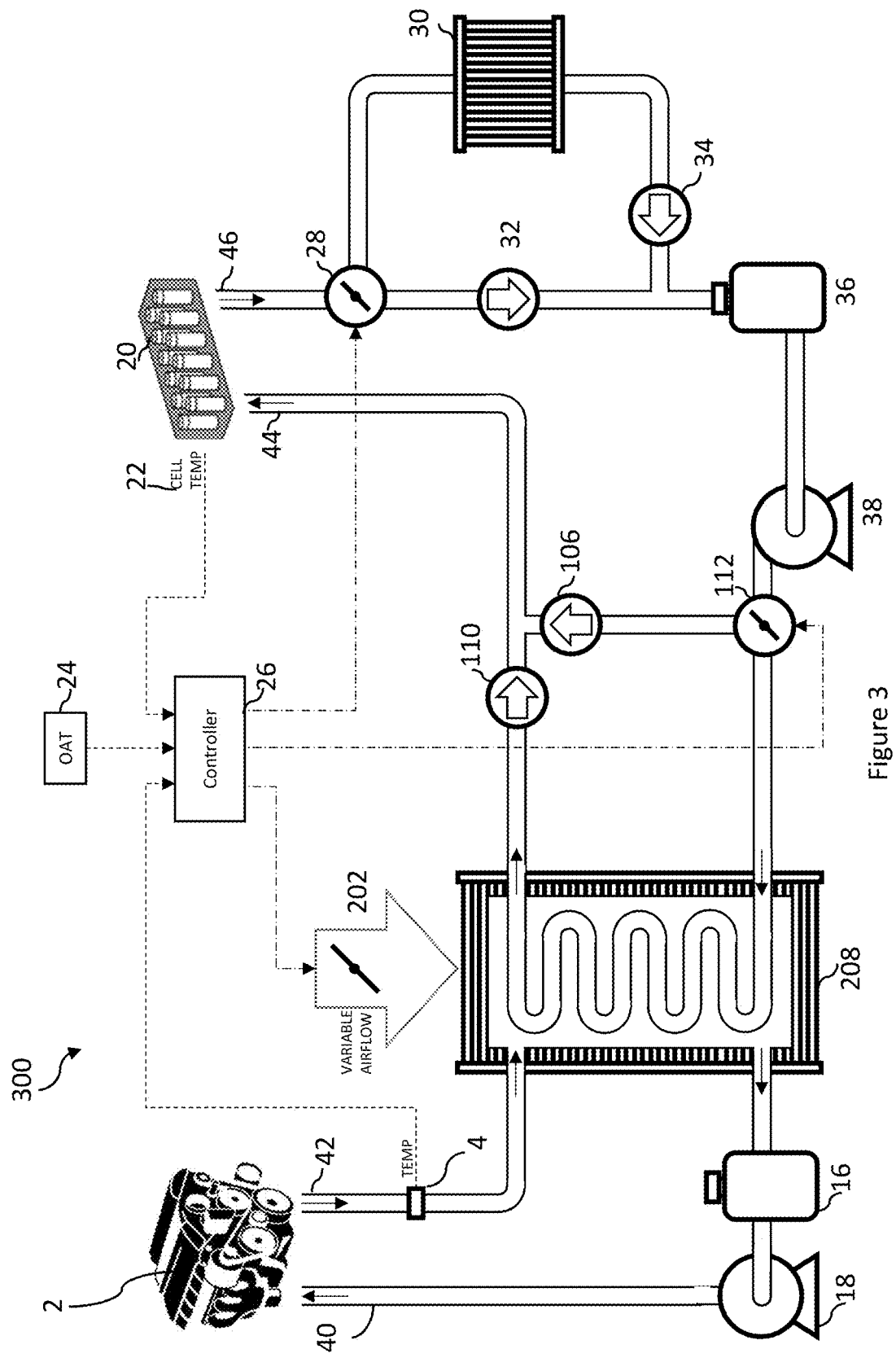
FIG. 3 illustrates a battery heating system utilizing waste heat extracted from a liquid cooled internal combustion engine through the engine coolant with a combined internal combustion engine radiator and heat exchanger, in accordance with an illustrative embodiment.
Figure 4:
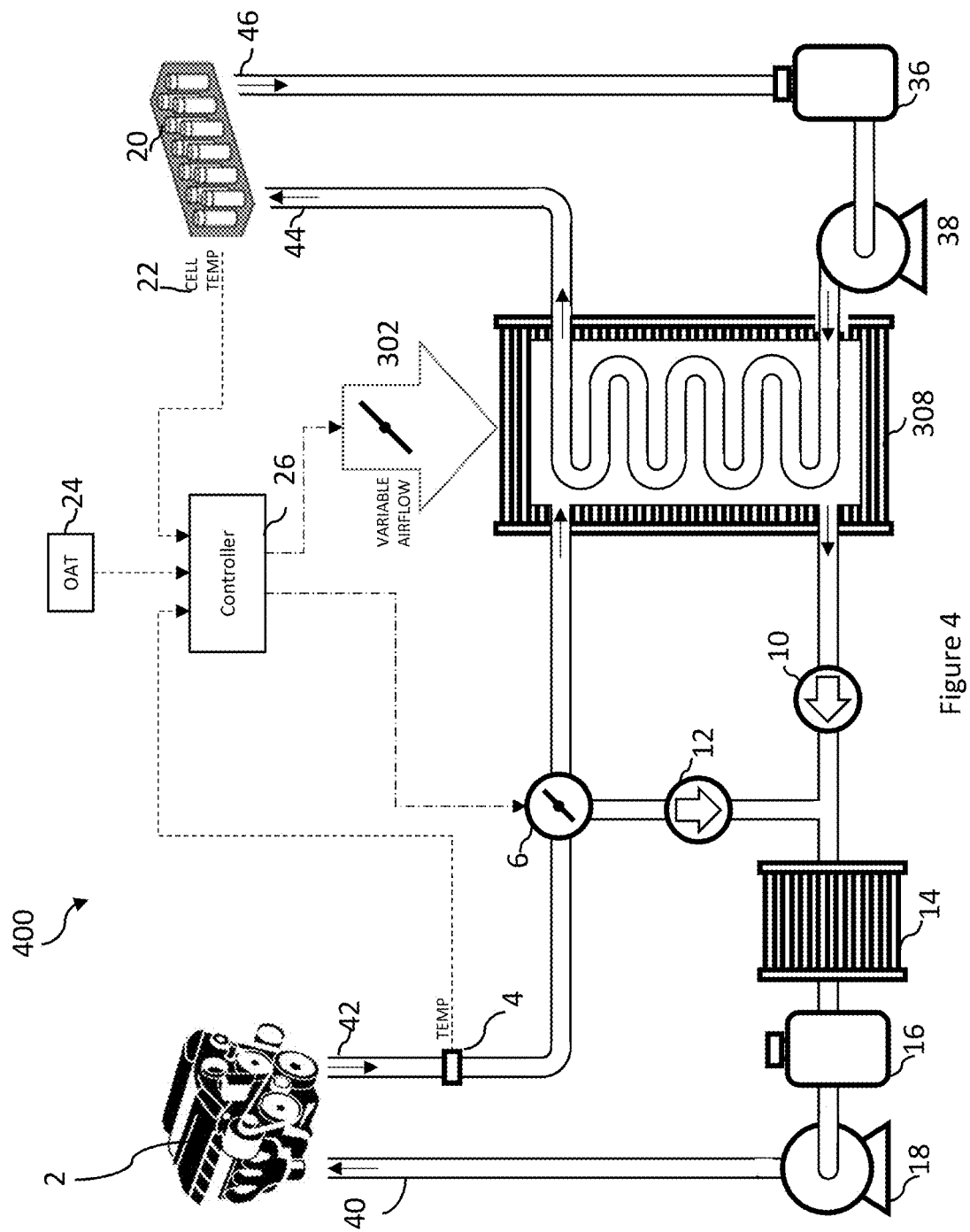
FIG. 4 illustrates a battery heating system utilizing waste heat extracted from a liquid cooled internal combustion engine through the engine coolant with a combined battery radiator and heat exchanger, in accordance with an illustrative embodiment.
Figure 5:
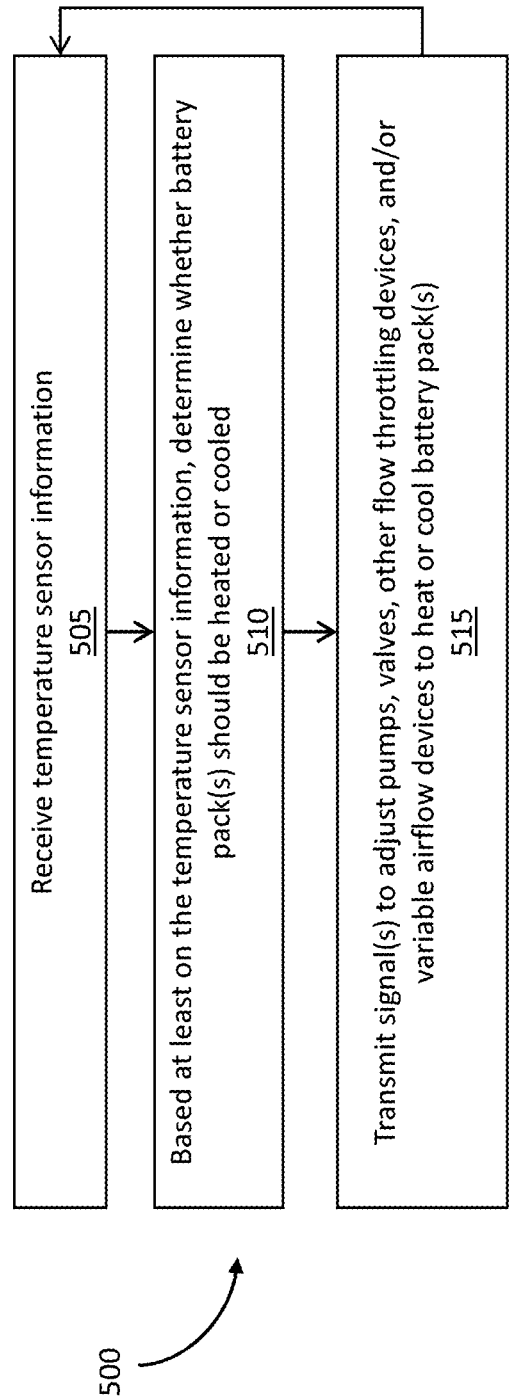
FIG. 5 is a flow diagram illustrating a method for controlling various components of a battery heating/cooling system in an aircraft with a hybrid electric powertrain, in accordance with an illustrative embodiment.
Figure 6:
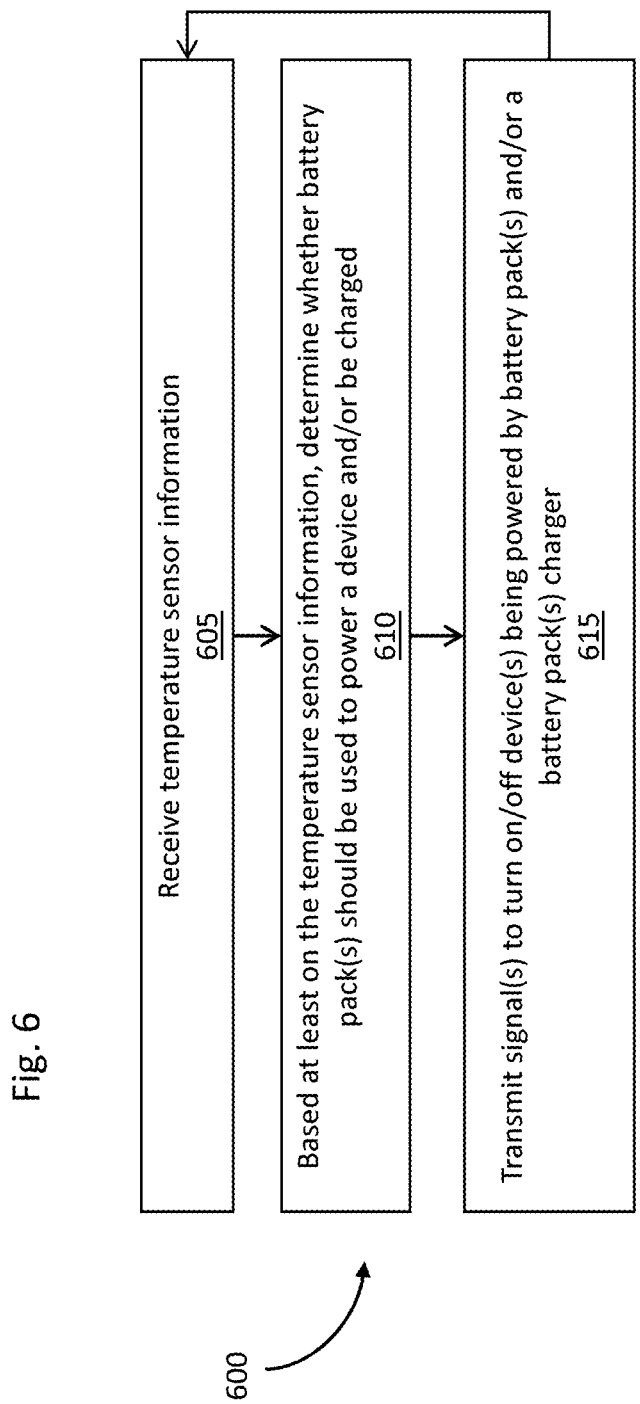
FIG. 6 is a flow diagram illustrating a method for controlling the use of or charging of batteries based on a temperature of the batteries, in accordance with an illustrative embodiment.

Even low-altitude aerospace applications may be exposed to temperatures below a desirable operating range for a lithium battery pack. The average low temperature in many global cities is below 5 C for significant portions of the year. For example, the average temperatures for each of the following cities is below 5 C for the months listed below:
  Chicago: November-April
  New York: December-March Beijing: November-March
Shanghai: December-February
Tokyo: December-March
Frankfurt: November-April
London: November-March
Seoul: November-March Referring now to the drawings, FIG. 1. illustrates an example battery heating system 100 that uses waste heat extracted from a liquid cooled internal combustion engine through the engine coolant with a heat exchanger bypass path on the engine coolant side of the heat exchanger. Next, FIG. 2 illustrates an example battery heating system 200 that uses waste heat extracted from a liquid cooled internal combustion engine through the engine coolant with a heat exchanger bypass path on the battery coolant side of the heat exchanger. Next, FIG. 3 illustrates an example battery heating system 300 that uses waste heat extracted from a liquid cooled internal combustion engine through the engine coolant with a combined internal combustion engine radiator and heat exchanger. Next, FIG. 4 illustrates an example battery heating system 400 that uses waste heat extracted from a liquid cooled internal combustion engine through the engine coolant with a combined battery radiator and heat exchanger. Next, FIG. 5 is a flow diagram illustrating a method 500 for controlling various components of a battery heating/cooling system in an aircraft with a hybrid electric powertrain. Finally, FIG. 6 is a flow diagram illustrating a method 600 for controlling the use of or charging of batteries based on a temperature of the batteries.

In FIG. 1, the system 100 includes an internal combustion engine 2 has an engine coolant inflow port 40 where cold engine coolant enters the engine 2, and an engine coolant outflow port 42 where hot engine coolant exits the engine 2. As described herein, while engine coolant is used in the example of FIG. 1, other coolants such as engine oil, exhaust, etc. may be used in various embodiments either alone or in combination with one another. The hot engine coolant then passes through a first temperature measurement sensor 4 before flowing through engine coolant valve 6. Engine coolant valve 6 may be operated by a control system 26 to allow some, all, or none of the hot engine coolant to flow into heat exchanger 8. In other words, the engine coolant valve 6 may be a variable flow valve. Engine coolant exiting the heat exchanger 8 passes through a first one-way valve 10 as it flows towards an engine radiator 14. Engine coolant bypassing the heat exchanger 8 flows through a second one-way valve 12 as it flows towards the engine radiator 14. Engine coolant exiting the engine radiator 14 flows into an engine coolant reservoir 16 where it is available for an engine coolant pump 18 to pump it back through the engine coolant circuit.

Battery coolant passes through the heat exchanger 8 where it may be selectively heated by transferring heat from the engine coolant. The battery coolant then enters a battery pack 20 in a battery coolant inflow port 44 and exits the battery pack 20 through a battery pack coolant outflow port 46. A battery temperature sensor 22 provides the control system 26 with data on the temperature of the battery pack 20. Battery coolant exiting the battery pack 20 through the battery coolant outflow port 46 passes through battery coolant valve 28 where the control system 26 may selectively allow battery coolant to flow to either a battery cooling radiator 30 or directly to a battery coolant reservoir 36. Third and fourth one-way valves 32 and 34 ensure that reverse flow in battery coolant circuit does not occur regardless of the position of the battery coolant valve 28.

Battery cooling fluid from a battery coolant reservoir 36 is then pumped through the heat exchanger 8 to reenter the battery pack 20.

The control system 26 selectively operates the engine coolant valve 6 to permit hot engine coolant to enter the heat exchanger 8 when the battery temperature sensor 22 indicates that the battery pack 20 is below its minimum operating temperature. The control system 26 also selectively operates the engine coolant valve 26 to restrict hot engine coolant from entering the heat exchanger 8 when battery temperature approaches the maximum operating temperature of the battery pack 20. When the engine coolant valve 6 is operated by the control system 26 to permit flow of hot engine coolant into the heat exchanger 8, the battery coolant valve 28 is operated by the control system 26 to restrict flow of battery cooling fluid into the battery cooling radiator 30. When the engine coolant valve 6 is operated by the control system 26 to restrict flow of hot engine coolant into the heat exchanger 8, the battery coolant valve 28 is operated by the control system 26 to permit flow of battery cooling fluid into the battery cooling radiator 30. FIG. 1 shows one embodiment of battery heating/cooling systems contemplated herein. Other configurations of valves, fluid lines, radiators, controllers, pumps, etc. may be used to accomplish battery heating and cooling.

The control system 26 may include a controller such as a microprocessor. The control system 26 may communicate with other aspects of an aircraft control system or may include other aspects of an aircraft control system. The control system 26 may also include an electronic storage medium (e.g., memory) coupled to a controller with instructions stored thereon for operating the battery heating systems and implementing battery heating methods as described herein. For example, the control system 26 may control various systems of an aircraft or other hybrid powertrain cooling/heating system according to the methods 500 and 600 described below and depicted in FIGS. 5 and 6. Such memory and/or instructions may include thresholds at which the batteries should be heated, cooled, maintained, etc., and how to incorporate other information such as information from an outside air temperature (OAT) sensor 24 or other sensors to heat, cool, or maintain the temperature of a battery pack. The control system 26 may also send information about the sensors to which it is connected to other systems or make determinations based on the sensor information. For example, information from various temperature sensors may indicate when the battery pack 20 is in a safe temperature range to start a flight, when the batteries are safe to charge, etc. Such information may be determined by the control system 26 or the sensor data may be communicated to other systems that make such a determination. Temperature sensors may also be in other locations or integrated into various components of the systems shown in FIGS. 1-4. In this way, the system may incorporate other temperature measurements into determining how to control the system for cooling/heating the battery pack 20 and/or the internal combustion engine 2. Accordingly, the control system 26 may also be utilized to control temperature of the internal combustion engine 2, for example using a thermocouple of the internal combustion engine 2.

In various embodiments, the pumps described herein may be electric or mechanically driven pumps. For example, the pumps 18 or 38 may be mechanically driven from an output of the internal combustion engine 2 such that battery power is not utilized to drive the pumps 18 or 38. In various embodiments, the pumps 18 or 38 may be electrically driven, either from a generator associated with the internal combustion engine 2 or the battery pack 20. For example, the pump 38 may be controlled to adjust the rate at which the battery pack 20 is cooled. Accordingly, an electrically driven pump may be used as the pump 38, as electric pumps may be more easily controlled than a mechanically driven pump. For example, a variable frequency device (VFD) may be used to control a pump to adjust or otherwise throttle flow of coolant through any of the coolant circuits described herein. A pump or fan may therefore be used as a type of throttling device to throttle the flow of fluid through the various components of the heating/cooling systems described herein.

Furthermore, although specific types of valves are shown and described in the example embodiments herein, other types of valves or any other type of controllable throttling devices may be used to limit flow through various parts of a battery cooling/heating system, direct flow to various parts of a battery cooling/heating system, or otherwise control the flow of fluid through a battery cooling/heating system. In addition, although specific configurations of battery cooling/heating systems are described herein, other configurations not specifically described herein may be used to achieve similar battery cooling or heating in hybrid powertrain systems.

In various embodiments, a battery pack may have a separate cooling system, such as a variable air flow used to direct outside air onto the battery pack. Such a system may be useful at altitude where air is generally cold enough to cool an overheating battery pack. In other embodiments, the battery may be liquid cooled as shown in FIGS. 1-4, and the liquid may be cooled using a heat exchanger with outside air, for example. In some embodiments, the liquid used to cool the battery packs may be the same fluid in the battery heating circuit described herein. In any case, the cooling system of the battery pack may be controlled by the control system or controllers described herein to be off or otherwise not in operation while the battery pack is heated. In other words, there is no need to cool the battery if it is desirable to heat the battery to get it to an optimal or normal operating temperature range.

FIG. 2 illustrates an example battery heating system 200 utilizing waste heat extracted from the liquid cooled internal combustion 2 engine through the engine coolant with a heat exchanger bypass path on the battery coolant side of the heat exchanger 8. Instead of a bypass path on the engine cooling circuit as shown in FIG. 1, a path for bypassing the heat exchanger 8 is shown on the battery cooling circuit. In particular, a two-way valve 112 is located at the output of the pump 38, such that battery coolant may be passed from the pump to the bypass path or into the heat exchanger 8. Similar to the valve 28, the valve 112 may be throttled to control how much fluid passes into the heat exchanger 8 and how much fluid passes through the bypass path. The output of the heat exchanger 8 has a one-way valve 110 to ensure that fluid only moves in one direction through the heat exchanger 8. The bypass path includes a one-way valve 106 that ensures that fluid only moves in a single direction through the bypass path. Accordingly, using the system shown in FIG. 2 as compared to FIG. 1, the fluid in the battery cooling circuit may be diverted from flowing into the heat exchanger 8, rather than diverting fluid in the engine cooling circuit from the heat exchanger 8 as shown in FIG. 1.

FIG. 3 illustrates an example battery heating system 300 utilizing waste heat extracted from the liquid cooled internal combustion engine 2 through the engine coolant with a combined internal combustion engine radiator and heat exchanger 208. In the system 300 of FIG. 3, the heat exchanger 8 and the radiator 14 of FIG. 2 are combined into a combination radiator/heat exchanger 208. In this way, the combination radiator/heat exchanger 208 is used to cool the engine coolant that flows through the combination radiator/heat exchanger 208 even if the battery coolant is not being cooled in the combination radiator/heat exchanger 208 (e.g., if flow is diverted from the battery cooling circuit into a bypass path). The combination radiator/heat exchanger 208 may cool engine coolant using airflow as a radiator while also cooling the battery cooling fluid. The combination radiator/heat exchanger 208 may also only cool the battery coolant where a variable airflow 202 over the radiator is controlled to not allow airflow over the radiator. The variable airflow 202 may also be adjusted to control how much the engine coolant is cooled using the combination radiator/heat exchanger 208. Combining the heat exchanger 8 and the radiator 14 may reduce weight of the aircraft. The control system 26 may be used to control the airflow over the combination radiator/heat exchanger 208 as desired.

FIG. 4 illustrates an example battery heating system 400 utilizing waste heat extracted from the liquid cooled internal combustion engine 2 through the engine coolant with a combined battery radiator and heat exchanger 308. In FIG. 4, a bypass path is shown on the engine cooling circuit side similar to FIG. 1, but the radiator 30 and the heat exchanger 8 are a combination radiator/heat exchanger 308. Such a configuration may reduce weight of the aircraft. The combination radiator/heat exchanger 308 may be used to heat the battery coolant via heat transfer from the engine coolant or may be used to cool the battery coolant using the variable airflow 302 into the combination radiator/heat exchanger 308. The variable airflow 302 may be controlled by the controller of the control system 26 to control the rate at which battery coolant is cooled and/or turn on/off cooling of the battery coolant by turning on/off airflow through the combination radiator/heat exchanger 308. The variable airflow 302 may also be controlled such that the combination radiator/heat exchanger 308 may also cool or not cool the engine coolant flowing into the combination radiator/heat exchanger 308. In other words, the engine coolant may be cooled by transferring heat to the battery coolant and/or may be cooled by transferring heat to air flowing through the combination radiator/heat exchanger 308.

The control system 26 described herein may include a controller and a memory with computer readable media stored thereon. Such computer readable media may be computer executable code that is executed by the controller to implement the various methods and systems described herein. The controller may be, for example, a computer processor. The instructions stored in a memory and executable by a processor may be implemented to perform methods such as the methods 500 and 600 described below.

FIG. 5 is a flow diagram illustrating the method 500 for controlling various components of a battery heating/cooling system in an aircraft with a hybrid electric powertrain. In alternative embodiments, fewer, additional, and/or different operations may be performed. Also, the use of a flow diagram is not meant to be limiting with respect to the order of operations performed.

At block 505, temperature sensor information is received. Such temperature information may be temperature information about engine temperature, engine coolant temperature, battery pack temperature, outside air temperature (OAT), battery coolant temperature, or any other temperature relevant to properly heating and or cooling aspects of a hybrid powertrain system. Such temperature information may be received from, for example, the temperature sensors 4, 22, and/or 24 of FIGS. 1-4. Thus, the controller of a control system can receive temperature information regarding various aspects of a hybrid powertrain system, so that proper decisions about how to adjust a heating/cooling system may be made.

At block 510, based at least on the temperature sensor information, the system determines whether battery pack(s) should be heated or cooled as described herein. The system may also determine a difference between a desired temperature for the battery pack(s) and the current temperature of the battery pack(s). Because many of the elements that may be used to control a heating/cooling system may be variable (e.g., may have more than a simple on/off capability), the amount the battery pack(s) should be heated or cooled may also be determined to help the system decide how to adjust those variable elements. For example, the pumps 18 and 38; the valves 6, 28, and 112; and the variable airflow devices 202 and 302 may all be variably adjusted to control how quickly the battery pack(s) are heated or cooled.

In addition to sensor information from the hybrid powertrain system, additional information may be considered when determining whether the battery pack(s) should be heated or cooled. For example, as described herein, flight path information (e.g., including expected flight path altitudes), weather forecasts or actual sensed weather conditions (e.g., by other aircraft), and any other information may be used to determine whether the battery pack(s) should be heated or cooled.

At block 515, the control system (e.g., from the controller) transmits one or more signals to various aspects of a battery heating/cooling system to heat or cool the battery pack(s). For example, signals may be transmitted to any controllable pumps, valves, other flow throttling devices, and/or variable airflow devices as described herein to control whether and at what rate to heat or cool the battery pack(s). Because the aspects of a battery heating/cooling system may be variable, the transmitted signals may include a quantitative aspect to control a degree to which each aspect is actuated (e.g., how open/closed a valve should be, what rate a pump should move fluid at, what rate a variable airflow system should move air at, etc.).

In addition, the system may be continuously monitored by the controller to determine whether the battery pack(s) need to be further heated or cooled, as indicated by the feedback arrow from the block 515 to the block 505 in FIG. 5. Accordingly, the system may adjust its heating or cooling of the battery pack(s) based on actual conditions (e.g., actual temperature of the battery pack(s)), any expected conditions, etc. as needed or desired to maintain the battery pack(s) within a normal operating temperature range or near an optimal operating temperature.

FIG. 6 is a flow diagram illustrating the method 600 for controlling the use of or charging of batteries based on a temperature of the batteries. In alternative embodiments, fewer, additional, and/or different operations may be performed. Also, the use of a flow diagram is not meant to be limiting with respect to the order of operations performed.

At block 605, temperature sensor information is received. Such temperature information may be temperature information about engine temperature, engine coolant temperature, battery pack temperature, outside air temperature (OAT), battery coolant temperature, or any other temperature relevant to properly heating and or cooling aspects of a hybrid powertrain system. Such temperature information may be received from, for example, the temperature sensors 4, 22, and/or 24 of FIGS. 1-4. Thus, the controller of a control system can receive temperature information regarding various aspects of a hybrid powertrain system, so that proper decisions about how to use or charge batteries may be made.

At block 610, based at least on the temperature sensor information, the system determines whether battery pack(s) should be used to power a device and/or charged. As described herein, battery pack(s) may be damaged or lose useful life if they are used or charged at temperatures outside a normal or optimal operating temperature range. Accordingly, the temperatures measured of battery pack(s) (e.g., using the temperature sensor 22 of FIGS. 1-4) may be used to control whether the battery pack(s) are used to power any devices and/or be charged. For example, if the battery pack(s) are too cold (e.g., below a normal or optimal operating temperature range), it may be damaging to the battery pack(s) to charge using, for example, a generator powered by a combustion engine (e.g., the combustion engine 2 of FIGS. 1-4).

At block 615, the control system (e.g., from the controller) transmits one or more signals to various aspects of an aircraft system indicating whether to power any devices using the battery pack(s) and/or whether the battery pack(s) should be charged. For example, signals may be transmitted to a generator or alternator used to charge battery pack(s) to actuate on or off depending on whether the battery pack(s) temperature is appropriate for charging. Signals may also be transmitted to the battery pack(s), battery pack controller(s), or any device or associated controller that controls how devices on a hybrid vehicle/aircraft may be powered. In this way, they system may control which devices on a hybrid vehicle/aircraft are powered by the battery pack(s) based on a temperature of the battery pack(s).

In an illustrative embodiment, any of the operations described herein may be implemented at least in part as computer-readable instructions stored on a computer-readable medium or memory. Upon execution of the computer-readable instructions by a processor, the computer-readable instructions may cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or from practice of the disclosed embodiments. It is intended that the scope of the invention be defined by the claims appended hereto and their equivalents.

What is claimed is:

1. A heating/cooling system for batteries in an aircraft with an internal combustion engine comprising:
 a combustion engine;
 a battery pack, wherein the battery pack has a battery operation temperature range comprising a first threshold temperature and a second threshold temperature higher than the first threshold temperature;
 a combustion engine cooling system;
 a battery pack heating system;
 a battery pack cooling system; and
 a controller configured to:
  control at least one throttling device configured to direct waste heat from the combustion engine cooling system to the battery pack heating system to maintain a temperature of the battery pack above the first threshold temperature;
  control the battery pack cooling system to maintain a temperature of the battery pack below the second threshold temperature; and predictively adjust the battery pack temperature based on expected altitude and expected rate of climb/descent information.

2. The system of claim 1, wherein the combustion engine comprises a liquid cooled piston engine, the combustion engine cooling system comprises an engine liquid coolant, and the at least one throttling device is further configured to direct the engine liquid coolant through a heat exchanger to transfer thermal energy from the engine liquid coolant to a battery liquid coolant to raise a battery liquid coolant temperature.

3. The system of claim 1, wherein the combustion engine comprises an air-cooled piston engine, the combustion engine cooling system comprises an oil circulation system, and the at least one throttling device is further configured to direct oil of the oil circulation system through a heat exchanger to transfer thermal energy from the oil to a battery coolant to raise a battery coolant temperature.

4. The system of claim 1, wherein the combustion engine is a turbine engine, the combustion engine cooling system comprises an oil circulation system, and the at least one throttling device is further configured to direct oil of the oil circulation system through a heat exchanger to transfer thermal energy from the oil to a battery coolant to raise a battery coolant temperature.

5. A hybrid powertrain system comprising:
a combustion engine;
a battery pack;
a combustion engine coolant circuit;
a battery pack coolant circuit;
a heat exchanger configured to exchange heat between the combustion engine coolant circuit and the battery pack coolant circuit;
at least one throttling device operatively connected to one of the combustion engine coolant circuit or the battery pack coolant circuit; and
a controller configured to:
transmit a signal to the at least one throttling device to adjust a flow of coolant through the heat exchanger of at least one of the combustion engine coolant circuit or the battery pack coolant circuit; and
predictively adjust a battery pack temperature based on expected altitude and expected rate of climb/descent information.

6. The system of claim 5, the at least one throttling device is a variable flow valve.

7. The system of claim 6, wherein the variable flow valve is configured to direct a flow of combustion engine coolant in the combustion engine coolant circuit between a bypass path that bypasses the heat exchanger and a heat exchanger path that passes through the heat exchanger.

8. The system of claim 6, wherein the variable flow valve is configured to direct a flow of battery pack coolant in the battery pack coolant circuit between a bypass path that bypasses a cooling radiator in the battery pack coolant circuit and a cooling radiator path.

9. The system of claim 6, wherein the variable flow valve is configured to direct a flow of battery pack coolant in the battery pack coolant circuit between a bypass path that bypasses the heat exchanger and a heat exchanger path that passes through the heat exchanger.

10. The system of claim 5, wherein the controller is further configured to determine that heat should be transferred to the battery pack based at least on one of a temperature of the battery pack, an outside air temperature, an expected outside air temperature, a current altitude, an expected altitude, or a temperature of combustion engine coolant leaving the combustion engine in the combustion engine coolant circuit.

11. The system of claim 5, wherein the at least one throttling device is a variable flow pump in the battery pack coolant circuit or the combustion engine coolant circuit.

12. The system of claim 5, wherein the heat exchanger comprises a combined heat exchanger and radiator.

13. The system of claim 12, further comprising a variable airflow device controllable to cause varying airflow over the combined heat exchanger and radiator.

14. The system of claim 13, wherein the variable airflow device is controllable by the controller.

15. A method for heating a battery pack of a hybrid powertrain system comprising:
receiving temperature sensor information from a battery pack temperature sensor;
determining, based at least in part on the temperature sensor information, that heat should be transferred to the battery pack to maintain the battery pack at a temperature above a predetermined threshold, wherein the determining that heat should be transferred to the battery pack further comprises determining an expected outside air temperature or expected altitude for a flight path of an aircraft that includes the hybrid powertrain system; and
transmitting a signal to at least one throttling device to adjust a flow of combustion engine coolant or battery pack coolant through a heat exchanger, wherein:
the combustion engine coolant flows through a combustion engine coolant circuit that includes a first side of the heat exchanger, and
the battery pack coolant flows through a battery pack coolant circuit that includes a second side of the heat exchanger.

16. The method of claim 15, wherein the at least one throttling device comprises at least one variable flow valve in the combustion engine coolant circuit or the battery pack coolant circuit.

17. The method of claim 15, further comprising receiving outside air temperature information, and wherein the determining that heat should be transferred to the battery pack is further based on the outside air temperature information.

18. The method of claim 15, wherein the signal is first signal, and the method further comprises:
determining, based at least in part on the temperature sensor information, that a temperature of the battery pack is below the predetermined threshold; and
transmitting, based at least in part on the temperature of the battery pack being below the predetermined threshold, a signal to turn off charging of the battery pack.

\* \* \* \* \*